No. 844,661. PATENTED FEB. 19, 1907.
H. H. CUTLER.
CLUTCH CONTROLLED ELEVATOR.
APPLICATION FILED DEC. 31, 1903.

Witnesses:
Robert H. Weir
Edwin B. H. Tower, Jr.

Inventor:
Henry H. Cutler
By: James R. Addington
Attorneys.

No. 844,661. PATENTED FEB. 19, 1907.
H. H. CUTLER.
CLUTCH CONTROLLED ELEVATOR.
APPLICATION FILED DEC. 31, 1903.

No. 844,661. PATENTED FEB. 19, 1907.
H. H. CUTLER.
CLUTCH CONTROLLED ELEVATOR.
APPLICATION FILED DEC. 31, 1903.

Witnesses:
Robert H. Weir
Edwin B. H. Tower, Jr.

Inventor
Henry H. Cutler
By Jones & Addington
Attorneys

No. 844,661. PATENTED FEB. 19, 1907.
H. H. CUTLER.
CLUTCH CONTROLLED ELEVATOR.
APPLICATION FILED DEC. 31, 1903.

Witnesses:
Robert H. Weir
Edwin B. H. Tower, Jr.

Inventor:
Henry H. Cutler
By Jones & Addington
Attorneys

UNITED STATES PATENT OFFICE.

HENRY H. CUTLER, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

CLUTCH-CONTROLLED ELEVATOR.

No. 844,661.   Specification of Letters Patent.   Patented Feb. 19, 1907.

Application filed December 31, 1903. Serial No. 187,366.

*To all whom it may concern:*

Be it known that I, HENRY H. CUTLER, a citizen of the United States, residing at Milwaukee, in the county of Milwaukee and State of Wisconsin, have invented a certain new and useful Improvement in Clutch-Controlled Elevators, of which the following is a full, clear, concise, and exact description, reference being had to the accompanying drawings, forming a part of this specification.

My invention relates to improvements in electric elevators. Where it is necessary in an apparatus of this character to start and stop the motor frequently in controlling the operation of the elevator mechanism, a much larger amount of current is required to run the motor than would be necessary if the motor operated continuously. This comes about by the fact that a motor in starting consumes a great deal more current than when it is in normal operation.

The present invention has for one of its objects to provide an electric elevator which may be perfectly controlled while the motor runs continuously.

A further object of the present invention is to provide an apparatus by which a number of elevators may be operated from the same motor and independently controlled.

Besides the aforesaid object of my invention there are various other objects, which will be apparent from the disclosure of my invention which I have made in this specification.

In the accompanying drawings I have illustrated one form of electric elevator which I have worked out for the purpose of revealing my invention. The several views in said drawings are as follows.

Figure 1:
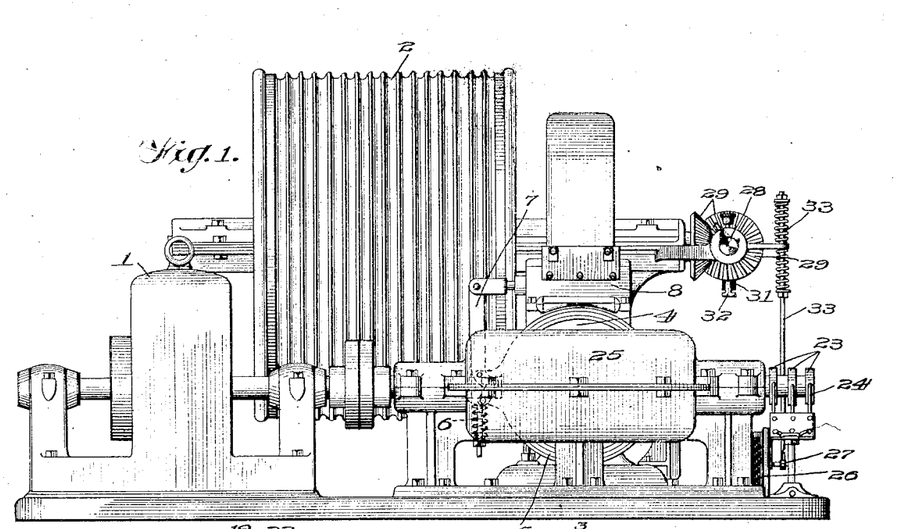
Figure 1 is an elevation of a part of an elevator mechanism with its motor.
Figure 2:
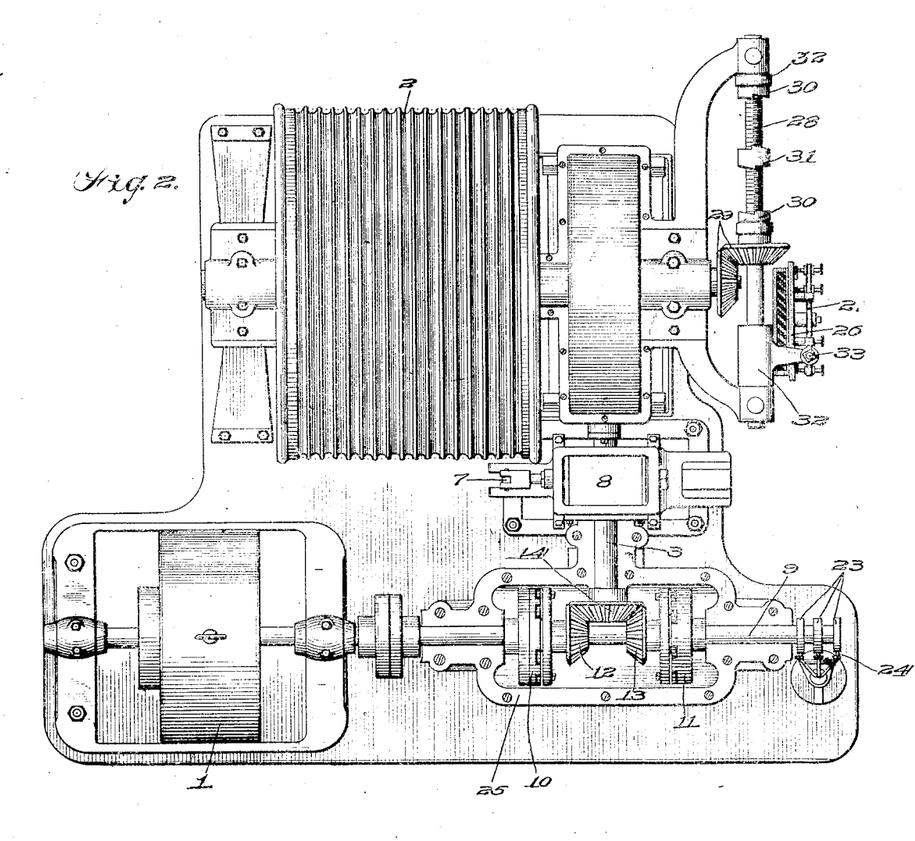
Fig. 2 is a plan view thereof.

As my invention is exemplified in the apparatus shown in the drawings a suitable motor 1, which may be of any type and designed for either a direct or alternating current, is associated with an elevator mechanism. This elevator mechanism may be of any construction. The one which I have herein shown has a winding-drum 2 for the hoisting rope or cable, said drum being journaled in suitable bearings and driven from a driving-shaft 3 by a worm and gear in the usual way. Upon the driving-shaft 3 is mounted a brake-wheel 4, which a brake shoe or band 5 is arranged to engage. This shoe is normally pressed into engagement with the brake-wheel by a spring 6 and has connected therewith a lever 7, which is also connected to the core of a solenoid 8. When the solenoid is energized, its core is attracted and the lever operated to remove the brake-shoe from the brake-wheel, and thereby release the elevator mechanism so that it may operate.

Connected in a suitable manner with the motor-shaft is a clutch-shaft 9, which carries the members of clutches or accelerators 10 and 11. As shown in the drawings, the magnet or primary member of each clutch is fixed upon the shaft 9, while the armature or secondary member may freely rotate. Arranged to rotate with the armature or secondary members of the clutches are miter or bevel gears 12 and 13, the gear 12 being attached to the armature or secondary member of the clutch 10 and the gear 13 being fastened to the armature member of the clutch 11. These gears both mesh with a bevel or miter gear 14, secured upon the driving or worm shaft 3.

The elevator mechanism may be driven from the motor through either of said clutches, and the direction in which said mechanism will be operated when it is driven through one of said clutches will be the opposite from what it would be if the mechanism were driven through the other clutch. This permits the elevator mechanism to be operated in either direction, so as to wind the hoisting rope or cable upon the winding-drum or unwind it therefrom, as desired, without stopping or changing the direction of operation of the motor.

Figure 3:
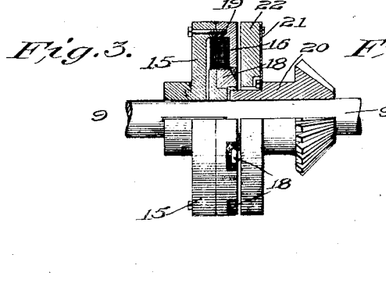
Fig. 3 is a sectional view taken through one of the clutches on the line 3 3 of Fig. 4.
Figure 4:
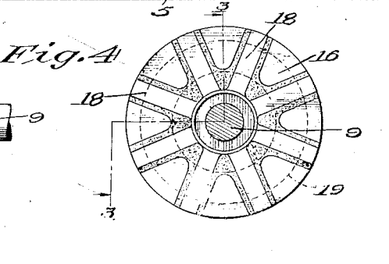
Fig. 4 is a face view of the magnet member of one of said clutches.

The clutches which I employ are by preference constructed as illustrated in detail in Figs. 3 and 4 and fully set forth in an application filed by me August 5, 1903, Serial No. 168,388. The magnet or primary member of each clutch has a backing-plate 15, upon which is mounted an outer ring having inwardly-projecting pole-pieces 16 and an inner ring having outwardly-projecting pole-pieces 18, these pole-pieces being arranged in overlapping positions and having the spaces between the same filled with non-magnetic material. The energizing-winding 19 for the magnet or primary member is placed within an annular channel formed between the backing-plate and the pole-pieces. The armature or secondary member has a hub 20, upon which is mounted a spring-metal disk 21, which near its center is secured to said hub and at its outer edges supports an armature-plate 22, normally separated from the pole-pieces of the magnet. This spring-disk serves to withdraw the armature-plate from the magnet or primary member when the energizing-coil is deënergized.

Due to the particular construction of the primary member of my clutch, I am enabled to provide a clutch in which the driven member is accelerated through the combined influence of induction and friction, the induction being adapted to create in the secondary member torque-producing currents. Due to the fact that the frictional effect is a constant force during the period of acceleration and the inductive effect is a gradually-decreasing force as the driven member accelerates, it will be seen that I am enabled to provide a clutch in which the driven member will be automatically gradually accelerated and will operate without the jar or sudden starting which has been found so objectionable to magnetic clutches of the prior art. It is apparent that if just sufficient current be admitted to start the driven member the same will not attain full speed and can be driven at any desired speed less than the speed of the driven member until the current is increased sufficiently to bring the driven member to full speed. Therefore by controlling the amount of current which is admitted to the energizing-winding of the clutch I am enabled to provide a clutch which is gradually accelerating and under the full control of the operator.

While I have shown one form of my clutch in the present invention, it will be understood that various modifications thereof may be made. Also the clutches may be arranged in connection with the motor and elevator mechanism in a different manner from that shown and still perform the desired function.

The terminals of the windings of the clutches are connected with suitable collecting-rings 23, against which bear brushes 24, which serve to convey current to the windings. The clutches and the gears assembled therewith are all preferably surrounded by a casing 25, containing a bath of oil.

Where the elevator mechanism is employed to operate an elevator-car, it is desirable to have a device to determine the revolutions the winding-drum may make in either direction, so as to insure the stoppage of the car or other device at the limits of its travel. For this purpose I preferably employ a limit-switch 26, which has a contact-arm 27, having brushes bridging suitable contacts. This switch may be operated to break or otherwise affect the circuit controlled thereby in a suitable way. The mechanism which I have shown herein to operate the switch has a shaft 28, journaled in suitable bearings and driven from the winding-drum by gears 29. At a suitable distance apart upon said shaft are catches 30, which turn therewith, and between said catches a collar 31 is threaded upon said shaft. This collar engages a pivoted frame 32, which has an arm connected by a rod 33 with the arm of the limit-switch. As the shaft 28 turns the collar is caused to travel along the same. When said collar comes into engagement with either of said catches, the frame is moved thereby and operates the limit-switch to break the circuit, so as to stop the elevator mechanism. The operation of the limit-switch in connection with the circuits will be hereinafter described.

Figure 5:
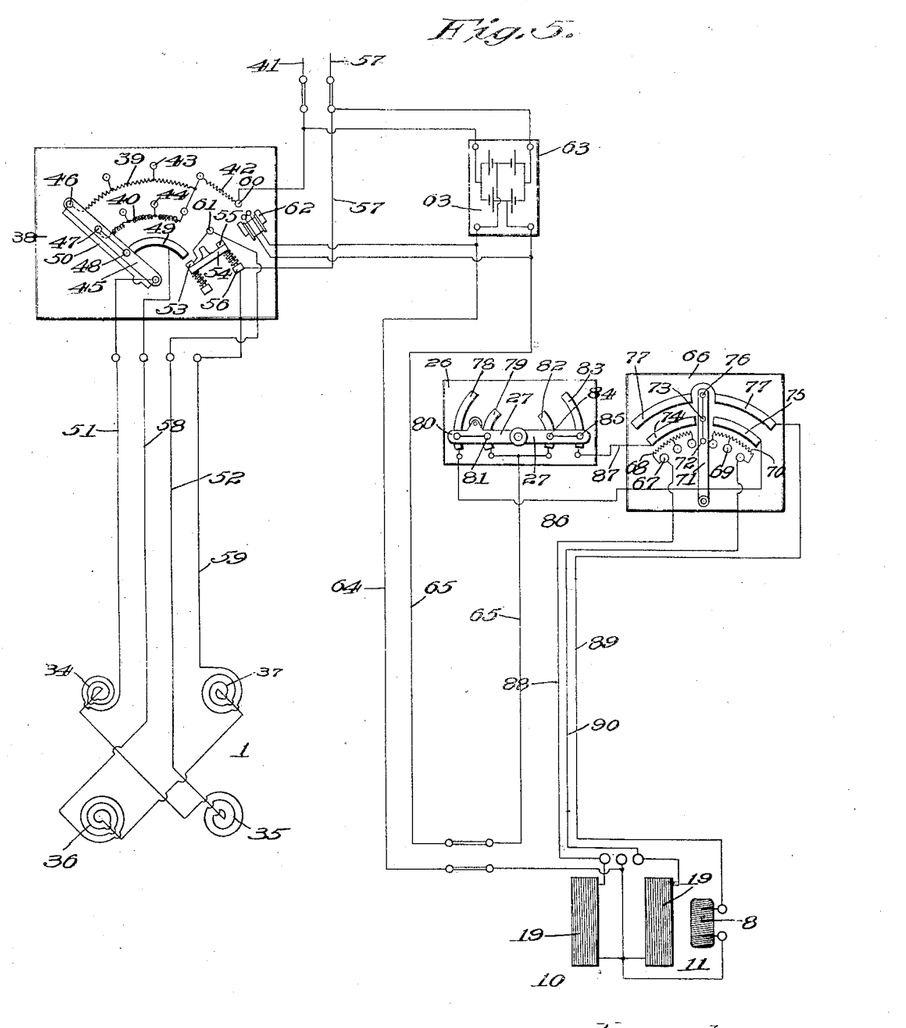
Fig. 5 is a diagram of a circuit arrangement for controlling the operation of the elevator mechanism.

The circuit arrangements for controlling the operation of the elevator mechanism is shown particularly in Fig. 5, to which I will now refer. Let it be assumed that the motor employed is designed for a single-phase alternating current, although, as before stated, any kind of a motor may be used. This motor has the field-coils 34, 35, 36, and 37. The secondary member or rotor of the motor I have not illustrated; but it will be understood that the usual form thereof is contemplated. To start the motor, a phase-splitter 38 is employed, which has a resistance 39 and a second resistance 40, which are connected with the supply-main 41 through the resistance 42. One of the first-mentioned resistances—say, for example, the resistance 39—is non-inductive in character, while the other resistance 40 is inductive in character. The resistances 39 and 40 are both subdivided into sections, the sections of the former being connected with the terminal or contact points 43 and the latter with the terminal or contact points 44. The contact-arm 45 of the phase-splitter has a brush 46, arranged to sweep over the contact-points 43, and a second brush 47, arranged to sweep over the contact-points 44. With the brush 47 is connected a brush 48, which engages a contact-segment 49 throughout the movement of the contact-arm.

When the contact-arm 45 is moved so that the brushes 46 and 47 engage the terminal points, circuit is closed from the supply-main 41 through resistances 42 and 39, brush 46, conductors 50 and 51, field-coils 34 and 35, conductor 52, terminal 53, bridge 54, terminals 55 and 56 to the opposite supply-main 57. Circuit is also closed from the resistance 42 through the resistance 40, brushes 47 and 48, contact-segment 49, conductor 58, field coils or windings 36 and 37, and conductor 59 to terminal 56. By reason of the resistance 39 and 40 being different in character the current passing through the non-inductive resistance 40 will be retarded in phase, and therefore a rotating field which will start the motor will be produced in the motor by the field windings or coils. After the motor has started, the further movement of the contact-arm will remove the resistances 39 and 40 from circuit section by section until said resistances have been entirely removed from the circuit. During the movement of the arm over the terminals of the resistances 39 and 40 the field-windings of the motor are connected in two parallel paths and are subjected to practically one-half of the normal voltage of the supply-circuit due to the interposition of the resistance 43. When the arm has reached its final position, the brush 46 engages the terminal 60 and the brush 47 engages the terminal 61 and a retaining-magnet 62 holds the arm during the normal operation of the motor against being returned to its initial position through the agency of a spring at its hub. In the movement of the contact-arm from the last terminals of the resistances 39 and 40 to the retaining-magnet the resistance 42 is removed from the circuit and the bridge 54 is operated by engagement with the arm to break the connection between the terminals 53 and 55. With the new circuits which are established the field-windings are connected in series, the current flowing from the supply-main 41 through terminal 60, brush 46, conductors 50 and 51, field-windings 34 and 35, conductor 52, terminal 61, brushes 47 and 48, contact-segment 49, conductor 58, field-coils 36 and 37, conductor 59, terminal 56 to the opposite supply-main 57.

The direct current for operating the clutches, the brake, and the retaining-magnet 62 is obtained by rectifying the alternating current from the supply-mains. The rectifier 63 shown in the drawings for this purpose is of the aluminium-iron type; but of course any other form of rectifier may be employed or an exciter or any other means used to generate a direct current, all of these things being arranged according to the circumstances. From the terminals of the rectifier extend the direct-current-supply wires 64 and 65.

For controlling the clutches 10 and 11 and the brake I provide a controller 66, which may be arranged in the elevator-car or in any other convenient place. This controller has a set of contacts 67, between which are connected the sections of a resistance 68 and a second set of contacts 69, between which are connected the sections of a resistance 70. The controller-arm 71 initially stands between these sets of contacts, so that when it is moved in one direction—say to the left—a brush 72, carried thereby, will engage the resistance-contacts 67, and when said arm is moved in, the opposite direction, or to the right, said brush will engage the resistance-contacts 69. A second brush 73, carried by the controller-arm, engages a contact-segment 74 when the controller-arm is moved to the left and a contact-segment 75 when the controller-arm is moved to the right. A third brush 76, also carried by the controller-arm, engages electrically-connected contact-segments 77 when the arm is moved in either direction, said brush being out of engagement with said segments 77 when said arm is in its initial position. All of these brushes are electrically connected with one another in a suitable manner.

One terminal of each of the windings 19 of the clutches 10 and 11 is connected with the direct-current-supply wire 64, as is also one terminal of the solenoid 8 of the brake. The opposite terminal of the winding of the clutch 10 is connected with the resistance 68, and the opposite terminal of the winding of the clutch 11 is connected with the resistance 70. The opposite terminal of the solenoid 8 is connected with the contact-segments 77. The contact-segments 74 and 75 are connected with the direct-current-supply wire 65 through the limit-switch.

The limit-switch has contact-segments 78 and 79, which are bridged by electrically-connected brushes 80 and 81, carried by the contact-arm and contact-segments 82 and 83, which are bridged by electrically-connected brushes 84 and 85, also carried by said arm. The contact-segments 79 and 82 are connected with the direct-current-supply wire 65, the contact-segment 78 is connected by conductor 86 with the contact-segment 75 of the controller, and the contact-segment 83 is connected by conductor 87 with the contact-segment 74 of the controller.

After the motor has been started the operation of the elevator mechanism may be controlled through the controller while the motor is running, the direction of operation of said mechanism depending upon the direction in which the controller-arm is moved from its initial position. Suppose that the controller-arm be moved to the left, the then circuit will be closed from the direct-current supply-wire 64 through winding 19 of the clutch 10, conductor 88, resistance 68, brushes 72 and 73, contact-segment 74, conductor 87, segment 83, brushes 85 and 84, segment 82 to the opposite direct-current supply-wire 65. A circuit for the current may also be traced from supply-wire 64, through the brake-solenoid 8, conductor 89, contact-segment 77, brushes 76 and 73 to segment 74. From here to the opposite supply-wire 65 the path for the current is the same as that previously described. With these circuits established the solenoid 8 will operate the brake to release the elevator mechanism and the clutch 10 operated to connect the elevator mechanism to the motor. As the controller-arm of the controller is moved farther to the right the sections of the resistance 68 will be removed from the circuit of the winding of the clutch, and the armature or secondary member will be gradually brought to the speed of the magnet or primary member without disturbing the supply-circuit for the motor or too suddenly subjecting the motor to the load. When the controller-arm reaches its final position, the armature or secondary member will rotate in unison with the magnet or primary member. If it be desired to operate the elevator mechanism at less than normal speed, the controller-arm may be placed at an intermediate position, so as to insert sufficient resistance in series with the clutch-winding to produce the desired speed of the secondary member relative to the primary member, while the motor continues to operate at its most effective speed. The movement of the controller-arm to the right will close the circuit from the supply-wire 64 through the winding of clutch 11, conductor 90, resistance 70, brushes 72 and 73, contact-segment 75, conductor 86, segment 78, brushes 80 and 81, and segment 79 to the opposite supply-wire 65. The circuit for the solenoid 8 may be followed in substantially the same manner as heretofore described. With the elevator mechanism driven through the clutch 11 it will operate in the opposite direction from what it did when driven through the clutch 10. The clutch 11 may be controlled by the controller in the same way as the clutch 10. If the elevator mechanism is permitted to operate in the direction which it is being driven by either of the clutches to a point where the car or other device controlled thereby would pass beyond a certain limit, the limit-switch will be operated in the manner previously set forth and break the circuit. This will cause the secondary member of the clutch to cease to be driven and permit the brake to hold the elevator mechanism against operation. After the limit-switch has operated the circuit can be closed through only the clutch, which will cause the elevator mechanism to be driven in the opposite direction from that in which it was previously operating.

Figure 6:
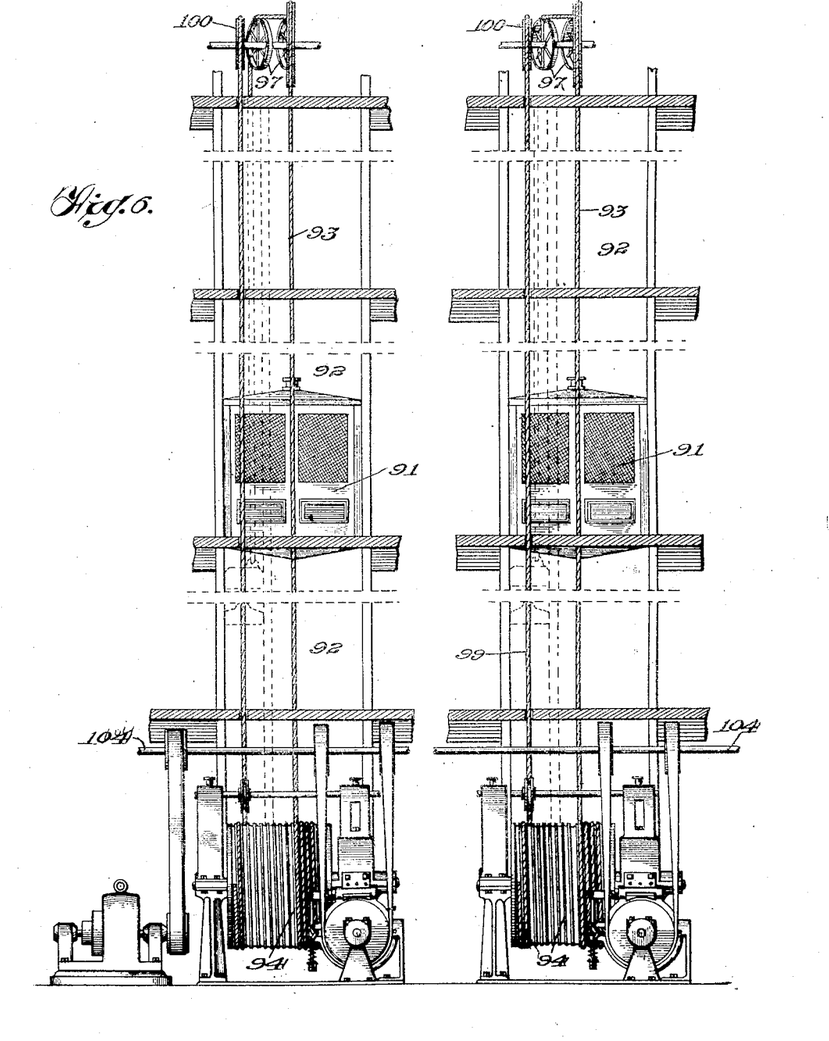
Fig. 6 is an elevation of a bank or plurality of elevators.
Figure 7:
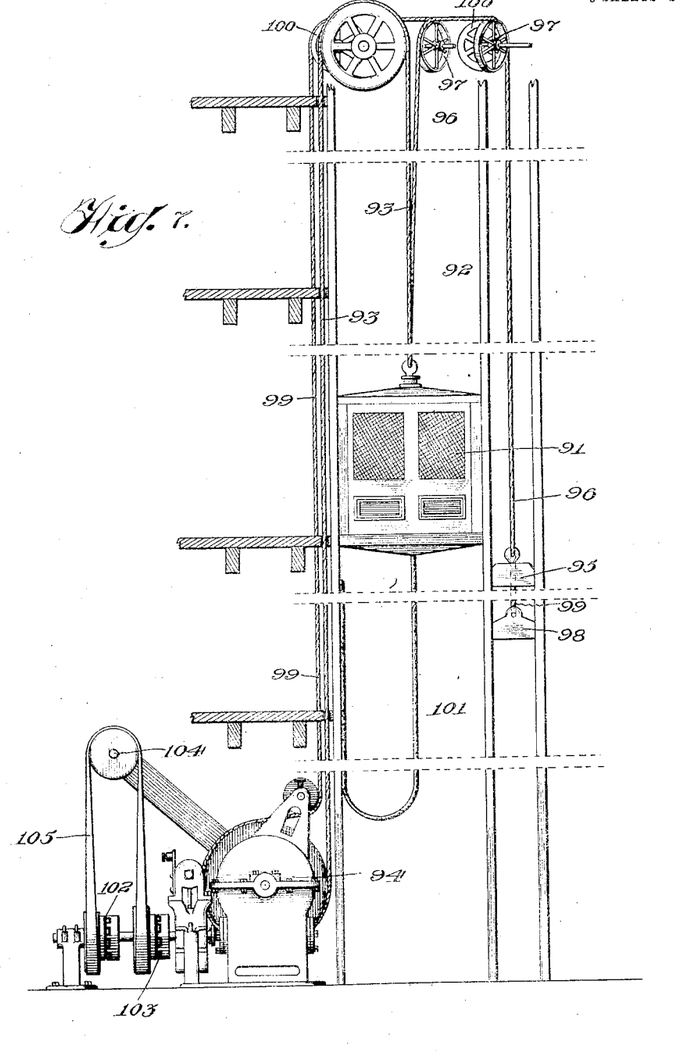
Fig. 7 is a side view of said bank of elevators.

In Figs. 6 and 7 I have illustrated an arrangement contemplated for operating a bank or plurality of elevators from a single motor. The several elevators each have a car 91, which is arranged in a shaft 92 and suspended by a hoisting rope or cable 93. This rope or cable passes over a pulley at the top of the shaft and is wound upon the winding-drum of a suitable elevator mechanism 94, the one herein shown being of the same general construction as the one previously described. The weight of the car is preferably counterbalanced by a weight 95, which is suspended by a cable 96, passing over pulleys 97 and connected to the car. The weight of the average load is preferably counterbalanced by a weight 98, which is suspended by a cable 99, passing over pulleys 100 and wound upon the winding-drum of the elevator mechanism. From the bottom of the elevator-car hangs a cable 101, which contains the circuit-wires leading to the controller arranged within the cars. Upon the worm-shaft of each elevator mechanism are mounted the members of clutches 102 and 103, said clutches being of the same construction as previously set forth. The driving member of each of said clutches is driven from the driving-shaft 104 by a belt 105 or in any other suitable way. All of the driving members of the clutches are driven from the single driving-shaft, which is operated by a single motor of any kind or construction and employing any sort of motive power. The driving members of the clutches of each of the elevator mechanisms are rotated in opposite directions, so that the elevator mechanism may be operated at will in either direction. The manner of controlling the clutches and brake is the same as that heretofore described. The several elevator-cars may be arranged so that one car will be ascending while the other is descending. In this way a very small motor may be employed to operate the elevators, as the car descending may be used to assist the car ascending.

In carrying out my invention in its various phases many different forms of motors, clutches, and elevator mechanisms may be utilized and many changes may be made in the details of construction, arrangement, and combination of parts herein set forth without in any way deviating from the spirit or the scope of my invention.

Having described my invention, what I claim as new, and desire to secure by Letters Patent, is—

1. The combination with an elevator mechanism, of a driving element therefor capable of running independently thereof, a magnetic clutch whose driven member is accelerated through the combined influence of induction and friction for connecting said driving element and elevator mechanism together to operate the elevator in one direction, and a second magnetic clutch whose driven member is accelerated through the combined influence of induction and friction for connecting said elevator mechanism and the driving element thereof to operate the elevator mechanism in an opposite direction.

2. The combination with an elevator mechanism, of a driving element therefor capable of running independently thereof, a magnetic clutch whose driven element is accelerated through the combined influence of induction and friction for connecting said driven element with said mechanism to operate the same in one direction, a second magnetic clutch whose driven member is accelerated through the combined influence of induction and friction for connecting said driven element with said elevator mechanism to operate the same in an opposite direction, and a controller for said clutches.

3. The combination with an elevator mechanism, of a driving element therefor capable of running independently thereof, a wheel for operating said mechanism in one direction and a second wheel for operating said mechanism in an opposite direction, and magnetic clutches whose driven members are accelerated through the combined influence of induction and friction for connecting said wheels with the driving element.

4. The combination with an elevator mechanism, of an electric motor for operating the same capable of running independently thereof, a magnetic clutch whose driven member is accelerated through the combined influence of induction and friction for connecting said motor and mechanism to operate the same in one direction, and a second magnetic clutch whose driven member is accelerated through the combined influence of induction and friction for connecting said motor and mechanism for operating the mechanism in an opposite direction.

5. The combination with an elevator mechanism, of an electric motor for operating the same capable of running independently thereof, a magnetic clutch whose driven member is accelerated through the combined influence of induction and friction for connecting said motor and mechanism to operate the mechanism in one direction, a second magnetic clutch whose driven member is accelerated through the combined influence of induction and friction for connecting said motor and mechanism to operate the mechanism in an opposite direction, and a controller for said clutches.

6. The combination with an elevator mechanism, of an electric motor for operating the same capable of running independently thereof, a wheel for turning the driving-shaft of said mechanism in one direction, a second wheel for turning said driving-shaft in an opposite direction, and magnetic clutches whose driven members are accelerated through the combined influence of induction and friction for connecting said wheels with said motor.

7. The combination with an elevator mechanism, of an alternating-current motor for operating the same capable of running independently thereof, a magnetic clutch for connecting said motor and said mechanism, a brake for said mechanism, a solenoid for operating the same, and means for supplying a direct current to said solenoid and said clutch.

8. The combination with an elevator mechanism, of an electric motor for operating the same capable of running independently thereof, a magnetic clutch or accelerator for connecting said motor with said mechanism, and a limit-switch for controlling the circuit through said clutch.

9. The combination with a plurality of elevator mechanisms, of a single driving element therefor, capable of running independently thereof, and a plurality of magnetic clutches whose driven members are accelerated through the combined influence of induction and friction for connecting said mechanisms with said driving element.

10. The combination with a plurality of elevator mechanisms, of a single electric motor for operating the same capable of running independently thereof, and a plurality of magnetic clutches whose driven members are accelerated through the combined influence of induction and friction for connecting said mechanisms with said motor.

11. The combination with an elevator mechanism, of a driving element therefor, a magnetic clutch for connecting said driving element and said mechanism, a brake for said elevator mechanism, a solenoid for operating said brake, a controller for said solenoid and clutch, and a limit-switch for controlling the circuit through said solenoid and clutch.

12. The combination with an elevator mechanism, of a driving element therefor, a magnetic clutch for connecting said driving element and elevator mechanisms to operate the same in one direction, a second magnetic clutch for connecting said driving element and mechanism for operating the same in an opposite direction, a brake for said elevator mechanism, a solenoid for operating said brake, and a controller for said clutches and solenoid.

13. The combination with an elevator mechanism, of a driving element therefor, a magnetic clutch for connecting said driving element with said mechanism to operate the same in one direction, a second magnetic clutch for connecting said driving element with said mechanism to operate the same in an opposite direction, a brake for said elevator mechanism, a solenoid for operating the same, a controller for said clutches and solenoid, and a limit-switch for controlling the circuit through said clutches and solenoid.

14. The combination with an elevator mechanism, of a driving element therefor, a magnetic clutch for connecting said driving element and mechanism, a brake for said elevator mechanism, a solenoid for operating said brake, and a limit-switch comprising a movable element adapted to move over contacts and open the circuit of said solenoid and clutch when the elevator-car has reached a predetermined position.

15. The combination with an elevator mechanism, of a driving element therefor, a magnetic clutch for connecting said driving element with said mechanism, a brake for the elevator mechanism, a solenoid for operating the same, a limit-switch comprising a movable element adapted to sweep over contacts to open the circuit to said clutch and solenoid when the elevator-car has reached a predetermined position, and means operated by said driving element for controlling the movement of said movable element.

In witness whereof I have hereunto subscribed my name in the presence of two witnesses.

HENRY H. CUTLER.

Witnesses:
F. S. WILHOIT,
T. E. BARNUM.